US011909180B2

(12) United States Patent
Yoshida et al.

(10) Patent No.: US 11,909,180 B2
(45) Date of Patent: Feb. 20, 2024

(54) GAS INSULATED SWITCHGEAR

(71) Applicant: Mitsubishi Electric Corporation, Tokyo (JP)

(72) Inventors: Tadahiro Yoshida, Tokyo (JP); Naoki Tanaka, Tokyo (JP); Masayuki Takebe, Tokyo (JP); Shintaro Kuroaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 659 days.

(21) Appl. No.: 17/052,250

(22) PCT Filed: Mar. 5, 2019

(86) PCT No.: PCT/JP2019/008547
§ 371 (c)(1),
(2) Date: Nov. 2, 2020

(87) PCT Pub. No.: WO2020/021754
PCT Pub. Date: Jan. 30, 2020

(65) Prior Publication Data
US 2021/0143618 A1 May 13, 2021

(30) Foreign Application Priority Data
Jul. 24, 2018 (JP) ................. 2018-138163

(51) Int. Cl.
*H02B 13/00* (2006.01)
*H02B 13/035* (2006.01)
*H02B 13/01* (2006.01)

(52) U.S. Cl.
CPC ......... *H02B 13/035* (2013.01); *H02B 13/005* (2013.01); *H02B 13/01* (2013.01)

(58) Field of Classification Search
CPC .... H02B 13/035; H02B 13/005; H02B 13/01; H02B 13/0356; H02B 13/0358; H02B 7/06; H02B 5/06
(Continued)

(56) References Cited

U.S. PATENT DOCUMENTS 8,254,088 B2 * 8/2012 Tanaka ..................... H02B 3/00
361/620
8,717,742 B2 * 5/2014 Kim ..................... H02B 13/035
361/620
(Continued)

FOREIGN PATENT DOCUMENTS

CN 1199234 A 11/1998
CN 104937793 A 9/2015
(Continued)

OTHER PUBLICATIONS

Translation of JPH 0265016 (document published May 16, 1990) (Year: 1990).*
(Continued)

Primary Examiner — William A Bolton
(74) Attorney, Agent, or Firm — BUCHANAN INGERSOLL ROONEY PC

(57) ABSTRACT

A hermetic portion on the side of a main body portion of a gas insulated switchgear and a hermetic portion of a bushing tank which has polymer bushings connected to the main body portion are configured separately, and electrical connection between the main body portion side and the bushing tank is carried out in an open portion. A mid tank is provided in the rear of the main body portion in which a switching apparatus is housed, and conductor portions which are horizontally led out from the main body portion are led into the mid tank, bent upward, and connected to bushings on the top of the mid tank. Cables are extended downward from the bottom of the bushing tank disposed above the mid tank via
(Continued)

a support panel, and in the open portion, the cables are connected to the bushings.

10 Claims, 9 Drawing Sheets

(58) Field of Classification Search
USPC .................................. 218/51, 45, 46, 53, 55
See application file for complete search history.

(56) References Cited

U.S. PATENT DOCUMENTS

| | | | |
|---|---|---|---|
| 9,425,589 B2* | 8/2016 | Hashimoto | H02B 1/22 |
| 9,472,926 B2* | 10/2016 | Sologuren-Sanchez | |
| | | | H02B 5/06 |
| 9,502,868 B2* | 11/2016 | Kagawa | H02B 13/0352 |
| 9,853,424 B2* | 12/2017 | Ono | H02B 5/06 |
| 2011/0088943 A1* | 4/2011 | Miyauchi | H02G 15/072 |
| | | | 174/650 |
| 2013/0240485 A1* | 9/2013 | Yabu | H02B 13/0354 |
| | | | 218/139 |
| 2014/0224770 A1* | 8/2014 | Hensberger | H01H 33/563 |
| | | | 73/30.01 |
| 2015/0244156 A1* | 8/2015 | Kutalek | H02B 11/04 |
| | | | 174/668 |
| 2015/0311684 A1 | 10/2015 | Kagawa et al. | |

FOREIGN PATENT DOCUMENTS

| | | |
|---|---|---|
| JP | H0265016 U | 5/1990 |
| JP | 2000209720 A | 7/2000 |
| JP | 2000232707 A | 8/2000 |
| JP | 2007028776 A | 2/2007 |
| JP | 2007097332 A | 4/2007 |
| JP | 2007181321 A | 7/2007 |

OTHER PUBLICATIONS

Extended European Search Report dated Jul. 21, 2021, issued in corresponding European Patent Application No. 19842222.2, 8 pages.
International Search Report (PCT/ISA/210) dated Apr. 9, 2019, by the Japan Patent Office as the International Searching Authority for International Application No. PCT/JP2019/008547.
Written Opinion (PCT/ISA/237) dated Apr. 9, 2019, by the Japan Patent Office as the International Searching Authority for International Application No. PCT/JP2019/008547.
Office Action dated Apr. 28, 2023, issued in the corresponding Chinese Patent Application No. 201980046954.7, 11 pages including 5 pages of English Translation.
Office Action dated Jul. 1, 2022, issued in corresponding Chinese Patent Application No. 201980046954.7, 11 pages including 5 pages of English Translation.
Office Action issued in corresponding Chinese Patent Application No. 201980046954.7, dated Dec. 12, 2022, 6 pages including 3 pages of English Translation.
Office Action dated Aug. 8, 2023, issued in the corresponding Chinese Patent Application No. 201980046954.7, 8 pages including 4 pages of English Translation.

* cited by examiner

GAS INSULATED SWITCHGEAR

TECHNICAL FIELD

The present invention relates to the field of a gas insulated switchgear.

BACKGROUND ART

In a heretofore known gas insulated switchgear, when transporting a product of the structure in which bushings protrude from a housing, in some cases, the product is transported loaded on a vehicle with the housing in an inclined state in order to avoid exceeding the limit on the height of transportation. Alternatively, when removing the bushings from a sealed tank, in which an insulating gas is sealed, when shipping the product, individual component portions are downsized and transported, and thereafter reassembly accompanied by a gas treatment is carried out when installing on site.

Also, a technology is disclosed wherein when the gas insulated switchgear includes a plurality of sealed tanks, bushings are provided at the end portions of conductor portions disposed in the sealed tanks, and insulated buses or connection cables are connected to the bushings, thereby carrying out electrical connection between the sealed tanks (for example, refer to PTL 1).

CITATION LIST

Patent Literature

PTL 1: JP-A-2007-97332

SUMMARY OF INVENTION

Technical Problem

In the heretofore known gas insulated switchgear, when removing the bushings from the sealed tanks at the time of transportation, and when carrying out reassembly on site, a gas treatment to collect or seal the insulating gas is required, resulting in long working hours for shipping preparation and on-site installation.

Also, the heretofore known gas insulated switchgear is of a configuration such that the conductor portions are extended out in a horizontal direction from the rear side of the main body portion in which a switching apparatus is housed, wherein with the aim of eliminating the need for a gas treatment, when connecting the cables, which are extended out from a connection target component portion, to the conductor portions, the conductor portions and the end portions of the cables are connected together in the horizontal direction. As a result, there is a problem in that the cables extend in a depth direction, increasing the depth dimension of the whole gas insulated switchgear.

Furthermore, the heretofore known gas insulated switchgear is of a configuration wherein the main body portion and the connection target component portion are integrally provided, so that it is necessary to adopt a structure which differs in response to the type of the connection target component portion.

The present application has been made to solve the problems, and an object of the present application is to eliminate the need for a gas treatment in disassembling when shipping and in assembling when installing, to realize a reduction in dimensions of component portions when transporting, and thus to enhance the degree of freedom to set the leading-out direction of conductor portions horizontally extended out from a main body portion of a gas insulated switchgear, and another object is to platformize a main body portion side component portion which is used in common without depending on the type of a connection target component portion to be cable connected to the main body portion side.

Solution to Problem

A gas insulated switchgear disclosed in the present application includes a main body portion in which a switching apparatus is housed; and a mid tank which, being provided in the rear of the main body portion, conductor portions extended out from which are led into a container having sealed therein an insulating gas, has bushings to which the end portions of the conductor portions are connected, wherein cables extended out from a connection target component portion are connected to the respective bushings.

Advantageous Effects of Invention

According to the gas insulated switchgear disclosed in the present application, it includes in the rear of the main body portion the mid tank having the bushings, and a configuration is such that the cables of the connection target component portion are connected to the bushings of the mid tank when assembling and are disconnected from the bushings when disassembling, wherein it is possible to disassemble and assemble the apparatus with both the mid tank in which an insulating gas is sealed and the connection target component portion being maintained in a hermetic state, eliminating the need for a gas treatment when shipping and when installing.

Also, a configuration is such that the conductor portions led into the mid tank from the main body portion is connected to the bushings exposed to the surface of the container of the mid tank, and the positions of the bushings can be used as the leading-out positions of the conductor portions. Therefore, the leading-out direction of the conductor portions not being limited only to the horizontal direction, it is possible to enhance the degree of freedom to set the leading-out direction of the conductor portions.

Furthermore, it is possible to use a component portion formed of both the main body portion and the mid tank as a common unit without depending on the type of the connection target component portion to be connected to the bushings.

DESCRIPTION OF EMBODIMENTS

First Embodiment

A description will be given, using FIGS. 1 to 5, of a gas insulated switchgear 100 according to the first embodiment of the present application. Also, FIGS. 9 and 10 each show a configuration diagram providing a comparison example.

Figure 1:
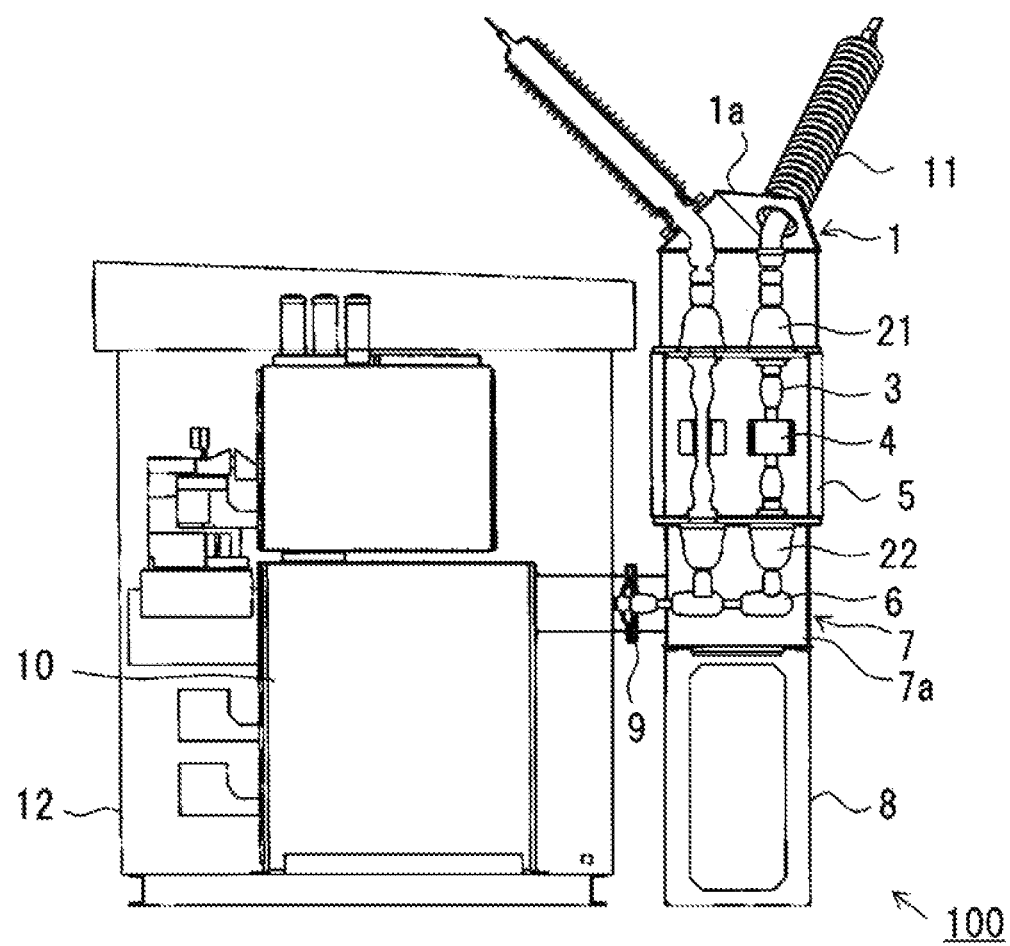
FIG. 1 is a sectional side view of a gas insulated switchgear according to the first embodiment.

FIG. 1 is a sectional side view of a gas insulated switchgear 100 according to the first embodiment, illustrating a main body portion 10 in which is housed a gas insulated switching apparatus (a switching apparatus) and a bushing tank 1 which, as a connection target component portion to be connected to the main body portion 10, is supplied with external electrical power.

The gas insulated switchgear 100 (C-GIS), being equipment related to transmission/distribution and reception of electrical power, is of an overhead line power reception structure used as, for example, that of substation equipment, and has as a main component portion the main body portion 10 (the switching apparatus) housed in a housing 12, adopting a configuration wherein a breaker, an earthing switch, a disconnector, a lightning arrester, an electroscope, and the like are aggregated inside the board of the main body portion 10.

In FIG. 1, the left side of the sheet is the front of the main body portion 10, and a configuration is such that a mid tank 7 is provided integral in the rear (the right side of the sheet) of the main body portion 10, and that the bushing tank 1 is disposed above the mid tank 7 via cables 3.

Then, in the structure of connection of these components, between the main body portion 10 and the mid tank 7, conductor portions 6 led out in a horizontal direction from the main body portion 10 to the depth side are connected to conductor portions 6 (connecting conductors) in the mid tank 7 via a three-phase spacer 9 (a spacer), and in the mid tank 7, the direction of extension of the conductor portions 6 is changed from the depth direction to another direction, for example, upward in a vertical direction, an up-down direction, or a height direction.

The mid tank 7 is of a configuration wherein bushings 22, the connecting portions of which are exposed, are provided on the top of a container 7a in which an insulating gas is sealed, and wherein the end portions of the conductor portions 6 are bent toward and connected to the bushings 22 in the mid tank 7. In the example of FIG. 1, the bushings 22 are positioned on the top of the mid tank 7, so that the cables 3 extended out from the bushing tank 1 which is the connection target component portion are connected downward from above the mid tank 7.

Also, the number of the conductor portions 6 led out from the main body portion 10 is three, and the three conductor portions 6 are connected one to each of three bushings 22 which are provided, exposed to the surface of the container 7a of the mid tank 7, in the container 7a of the mid tank 7. Here, in order to realize the disposition of three polymer bushings 11 in FIG. 4 to be described hereinafter, the three conductor portions 6 led in horizontally from the main body portion 10 are provided in a length which reaches immediately below the respective polymer bushings 11 and are extended upward from the distal ends of their horizontal portions.

Furthermore, a total of three cables 3 connected one to each of the three bushings 22 are configured to extend linearly upward from the bushings 22 and to be connected to the bottom portion of a container 1a of the bushing tank 1 which is a connection target.

The bushing tank 1 is configured to be provided with the container 1a in which an insulating gas is sealed, the three polymer bushings 11 protruding upward from the top portion of the container 1a, and bushings 21 which are provided exposed to the bottom side of the container 1a and to which the upper end portions of the cables 3 are connected, and the bushing tank 1 is supported above the mid tank 7 via a support panel 5 (a spacer or a support component portion). As shown in FIG. 1, the polymer bushings 11 are provided protruding above the top of the housing 12.

Figure 3:
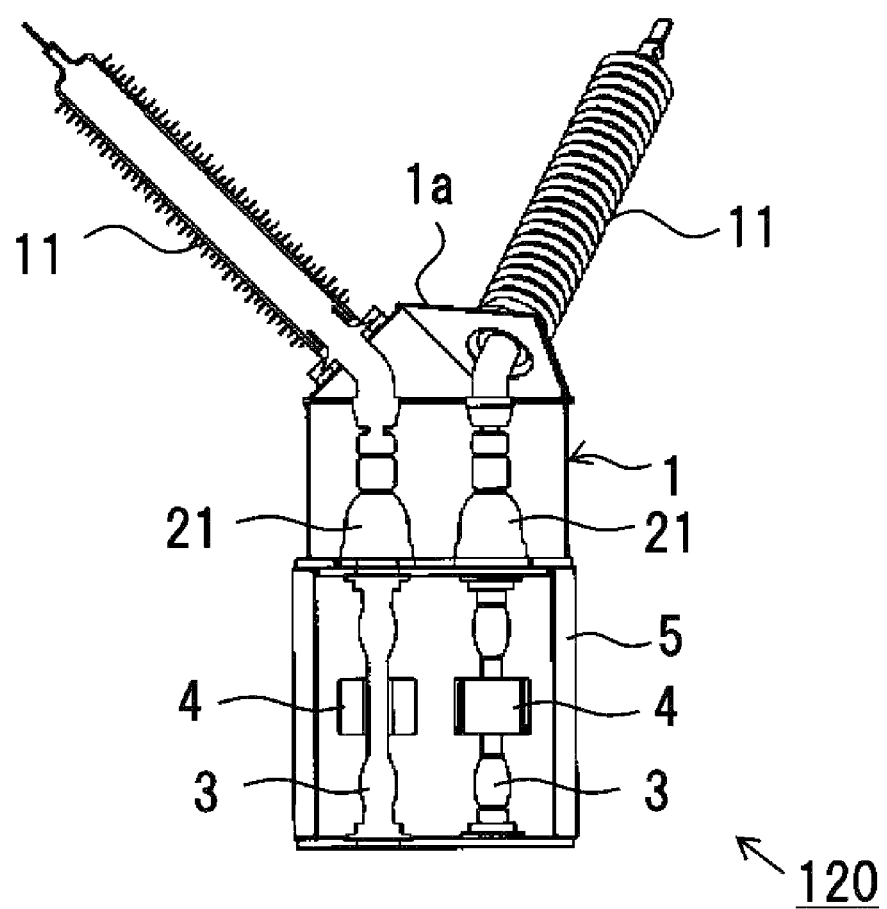
FIG. 3 is a sectional side view of bushings of FIG. 1 and a connection component portion thereof.

In the support panel 5, the cables 3 configure linear lead portions which extend in the up-down direction so as to connect between the bushings 21 and 22 disposed in the up-down direction, and as illustrated in FIGS. 1 and 3, current transformers 4 (CTs) are disposed in the intermediate position of the length of the cables 3.

In this way, in the rear of the main body portion 10, a configuration is such that the mid tank 7, the cables 3 supported by the support panel 5, and the bushing tank 1 are stacked in sequence on a mount 8.

Figure 2:
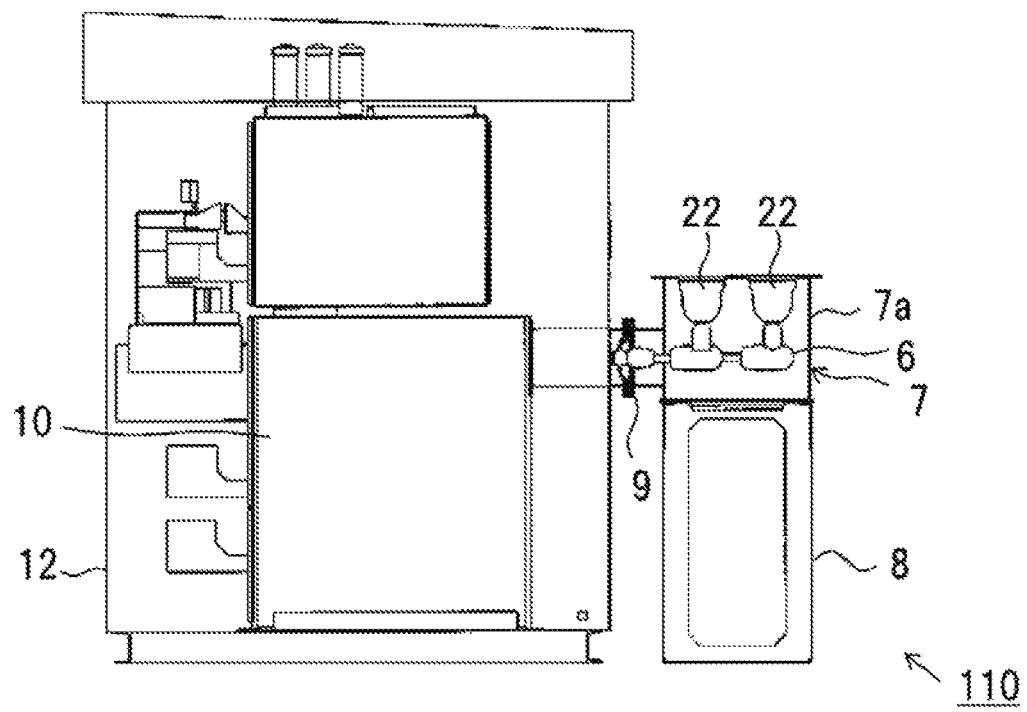
FIG. 2 is a sectional side view of a main body portion of FIG. 1 and a connection component portion thereof.

Also, FIG. 2 is a sectional side view of the main body portion 10 of FIG. 1 and a connection component portion thereof, showing a main body portion side connection component portion 110 wherein the main bogy portion 10 and mid tank 7 of the gas insulated switchgear 100 are integrally formed.

FIG. 3 is a sectional side view of the polymer bushings 11 of FIG. 1 and a connection component portion thereof, showing a bushing side connection component portion 120 which is a connection target component portion to be connected to the main body portion side connection component portion 110.

As shown in FIG. 1, the gas insulated switchgear 100 is of a configuration wherein in the rear of the main body portion 10, the bushing tank 1 is disposed above the mid tank 7 via the linear cables 3 extending in the height direction, and the bushings 22 of the mid tank 7 and the cables 3 are connected together in an open space (an open portion).

Here, as shown in FIG. 2, in the main body portion side connection component portion 110, the portion between the main body portion 10 and the mid tank 7 is of a gas insulated structure using an insulating gas, for example, an $SF_6$ gas, forming a hermetic portion.

As shown in FIG. 1, the portion between the mid tank 7 and the bushing tank 1 is of a connection structure using the cables 3, forming an open portion.

Therefore, even when the operation of connecting and disconnecting the cables 3 to and from the bushings 22 is carried out, it is an operation in the open space, thus not involving a gas treatment.

Figure 8:
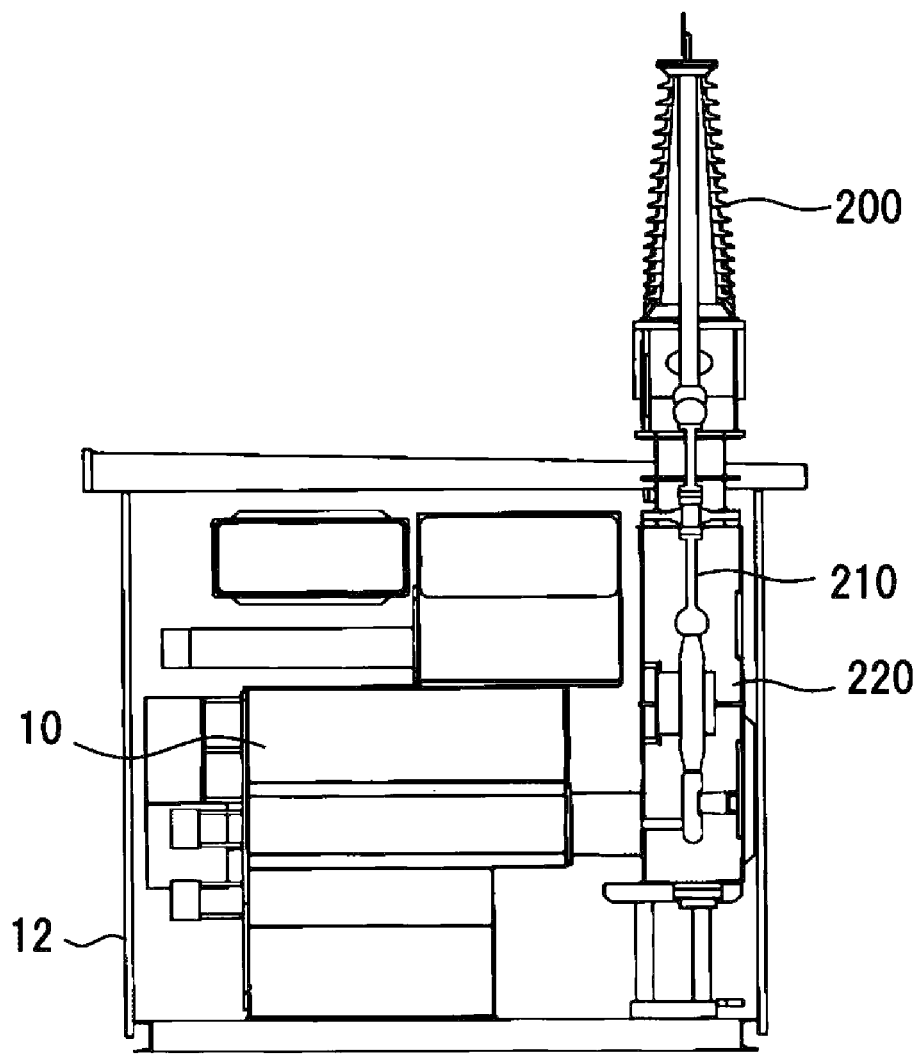
FIG. 8 is a diagram showing a comparison example required to explain the first embodiment.

Here, FIG. 8 shows a sectional side view of a gas insulated switchgear of a heretofore known structure as a comparison example. FIG. 8 shows an example in which a direct mold bushing wherein a bushing 200 is integrated with a tank 220 is provided integral with the main body portion 10 and in which the bushing 200 is disposed protruding from above the housing 12. Then, a configuration is such that the main body portion 10 and the bushing 200 are connected together by a conductor 210, and a structure is such that when the bushing 200 is disassembled from the tank 220, the hermetic property of the tank 220 is lost, so that a gas treatment is required when disassembling/assembling.

On the contrary, in the present structure, it is only necessary to connect and disconnect the cables 3 to and from the bushings 22, and it does not happen that the hermetic portion between the bushing tank 1 and the mid tank 7 is opened when disassembling/assembling, so that it is possible to eliminate the need for a gas treatment operation occurring when installing, enabling a reduction in installation time.

In FIG. 1, the mid tank 7 and the bushing tank 1 are supported by the mount 8 and the support panel 5. Also, FIGS. 1 and 2 illustrate the case of a separation structure in which the main body portion 10 and the mount 8 are separated from each other, but it goes without saying that the mount 8 can also be provided integral with the main body portion 10.

Then, when transporting the gas insulated switchgear 100, as shown in FIGS. 2 and 3, one product is separated into two forms: the main body portion side connection component portion 110 and the connection target component portion (for example, the bushing side connection component portion 120), and the individual structures, by being reduced in size, can be adjusted so as to fall within the range of transportation restrictions which limit the external dimensions, weight, and the like of apparatus component portions.

When disassembling the apparatus, the cables 3 are connected to the bushing tank 1 side, providing the integrated bushing side connection component portion 120 of FIG. 3. When there is a need to disassemble the bushing side connection component portion 120 into smaller sizes, however, it goes without saying that it is also possible to disconnect the connection between the bushings 21 and the upper end portions of the cables 3 and thus to separate the bushing tank 1 and the support panel 5 from each other, producing individual downsized portions for transportation.

Figure 4:
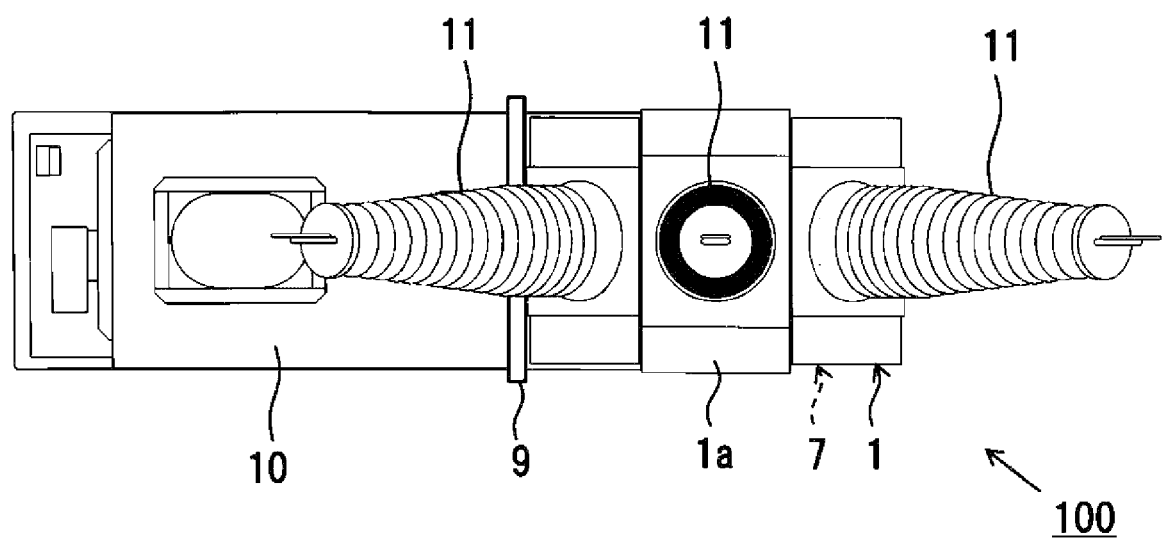
FIG. 4 is a top view of the gas insulated switchgear according to the first embodiment.

Next, FIG. 4 shows a top view of the gas insulated switchgear 100 according to the first embodiment. In FIG. 4, the bushing tank 1 is disposed above the mid tank 7 via the cables 3. The three polymer bushings 11 provided on the bushing tank 1 are disposed, in a straight line along the depth direction, on the top portion of the container 1a, and are installed, for example, in such a way that the three polymer bushings 11 are evenly spaced apart, that the polymer bushing 11 in the central portion extends upright from the top of the container 1a, and that the leading end portions of the polymer bushings 11 at both ends are symmetrically inclined outward.

In the case of the configuration of FIG. 4, the polymer bushing 11 disposed deepest is provided inclined toward the depth side, and the dimension in the depth direction of the apparatus cannot be minimized, but in a not-shown portion, at least the bushing tank 1 and the mid tank 7 can be connected together in the up-down direction, in the open portion, via the cables 3, so that a gas treatment accompanied by disassembling/assembling of the product is not required, and it is possible to maintain the hermetic quality of the individual tanks, and possible to obtain the gas insulated switchgear 100 with good workability in transportation.

Figure 5:
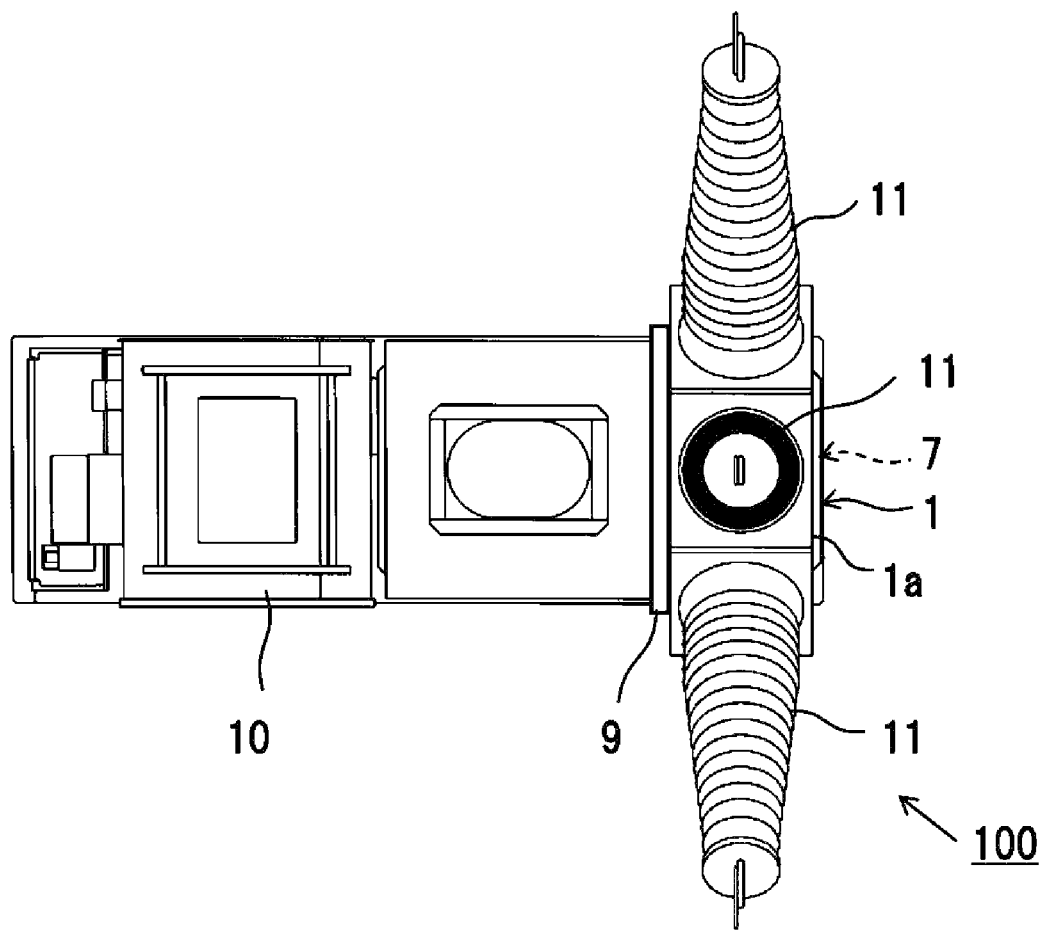
FIG. 5 is a top view of the gas insulated switchgear according to the first embodiment.

Also, as shown in FIG. 5, the three polymer bushings 11 can also be disposed set upright in a straight line (for example, in the width direction) crossing the depth direction, and in the example of FIG. 5, the direction of the disposition of the three polymer bushings 11 perpendicularly crosses the depth direction of the apparatus, enabling a reduction in the dimension in the depth direction of the product.

Also, it is also possible to adjust the disposition so as to align the three polymer bushings 11 in a straight line in a direction other than that of the modification examples shown in FIGS. 4 and 5, and by so doing, too, the bushing tank 1 and the mid tank 7 can be connected in the up-down direction, in the open portion, via the cables 3, so that it is possible to eliminate the need for a gas treatment accompanied by disassembling/assembling.

It goes without saying that it is possible, regardless of the disposition of the polymer bushings 11, to use the main body portion side connection component portion 110 as a common component.

Figure 9:
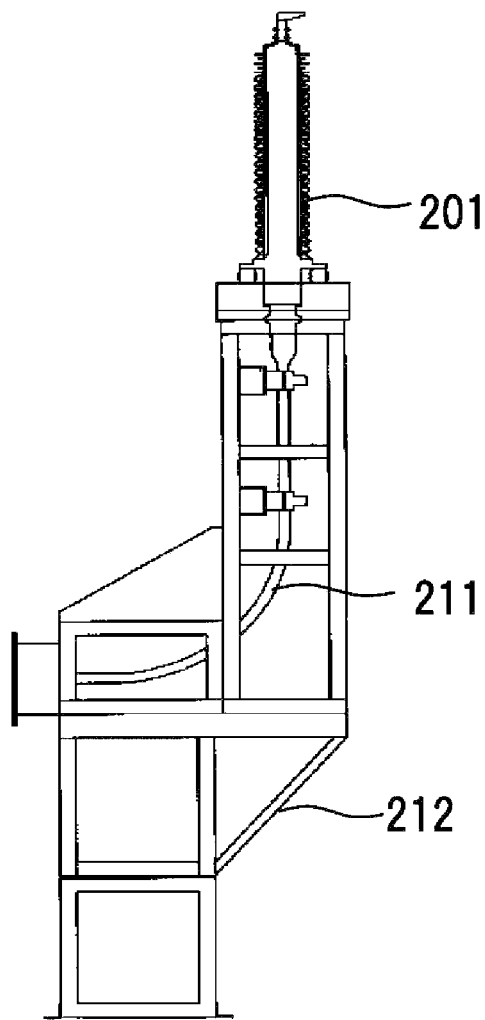
FIG. 9 is a diagram showing a comparison example required to explain the first embodiment.

Here, FIG. 9 shows a sectional side view of an example in which a polymer bushing is applied to a gas insulated switchgear of a heretofore known structure. The bushing of this comparison example is of a configuration wherein a cable 211 is directly connected to the main body portion 10. Then, an end portion of the cable 211 is horizontally extended in order to connect the cable 211 extending downward from a polymer bushing 201, in the horizontal direction, to the rear side of the main body portion 10. That is, in the case of a structure wherein the cable 211 is directly connected to the main body portion 10, a space in which to bend the cable 211 is needed in the depth direction of the main body portion 10. Therefore, a space, in which are disposed the cable 211 and a support portion 212 supporting the cable 211 and which corresponds to a bend R of the cable 211 as the dimension in the depth direction, is needed in the depth direction of the main body portion 10.

In the present configuration, however, as shown in FIGS. 1 and 2, a configuration is such that the conductor portions 6 are bent in the container 7a of the mid tank 7, the direction of extension of which is changed, and are extended toward the top of the container 7a of the mid tank 7 and connected to the bushings 22, and it is possible to linearly wire the cables 3 in the height direction, and possible to reduce the dimension in the depth direction occupied by the cables 3.

The gas insulated switchgear 100 is configured in this way, thereby avoiding the hermetic structure of a portion to be required to be disassembled in the period between shipment up to on-site installation, whereby a gas treatment accompanied by disassembling/assembling does not occur, and an operation to open a hermetic portion does not occur, so that it is possible to maintain the quality regarding the insulation property in the tank. In addition, it is possible to omit a gas treatment operation when shipping and when installing, enabling a reduction in the number of operating devices and in operating time.

Also, a configuration is such that the conductor portions 6 led out from the main body portion 10 are connected to the bushings 22 in the mid tank 7, so that the leading-out direction of the conductor portions 6 not being limited only to the horizontal direction, the bushings 22 can be disposed in any respective positions on the surface of the mid tank 7, so that the degree of freedom to set the leading-out direction of the conductor portions 6 is high, and for example, by leading out the conductor portions 6 in the height direction, the dimension in the depth direction of the apparatus can be suppressed to a small extent.

Also, it goes without saying that the bushings 22 can be disposed in any respective portions on the surface of the container 7a of the mid tank 7, and that it is possible to adopt an appropriate disposition of the bushings 22 corresponding to the characteristics of the product.

Second Embodiment

A description has been given, in the heretofore described first embodiment, of the case in which the connection target component portion of the main body portion side connection component portion 110 of the gas insulated switchgear 100 is the bushing side connection component portion 120 of the overhead line power reception configuration. The main body portion side connection component portion 110 can be used platformized as a common unit even though the connection target component portion changes in various ways.

In the second embodiment, a description will be given, using FIGS. 6 and 7, of a gas insulated switchgear 101 wherein the connection target component portion of the main body portion side connection component portion 110 is a transformer side connection component portion 130 which includes a transformer primary unit 13.

The gas insulated switchgear 101 (C-GIS), being connected to the transformer primary unit 13 (corresponding to a transformer component portion) called an extra-high-voltage transformer primary side, for example, when installing an extra-high-voltage substation on the premises, is adopted to protect the electrical circuit against an electrical accident.

Figure 6:
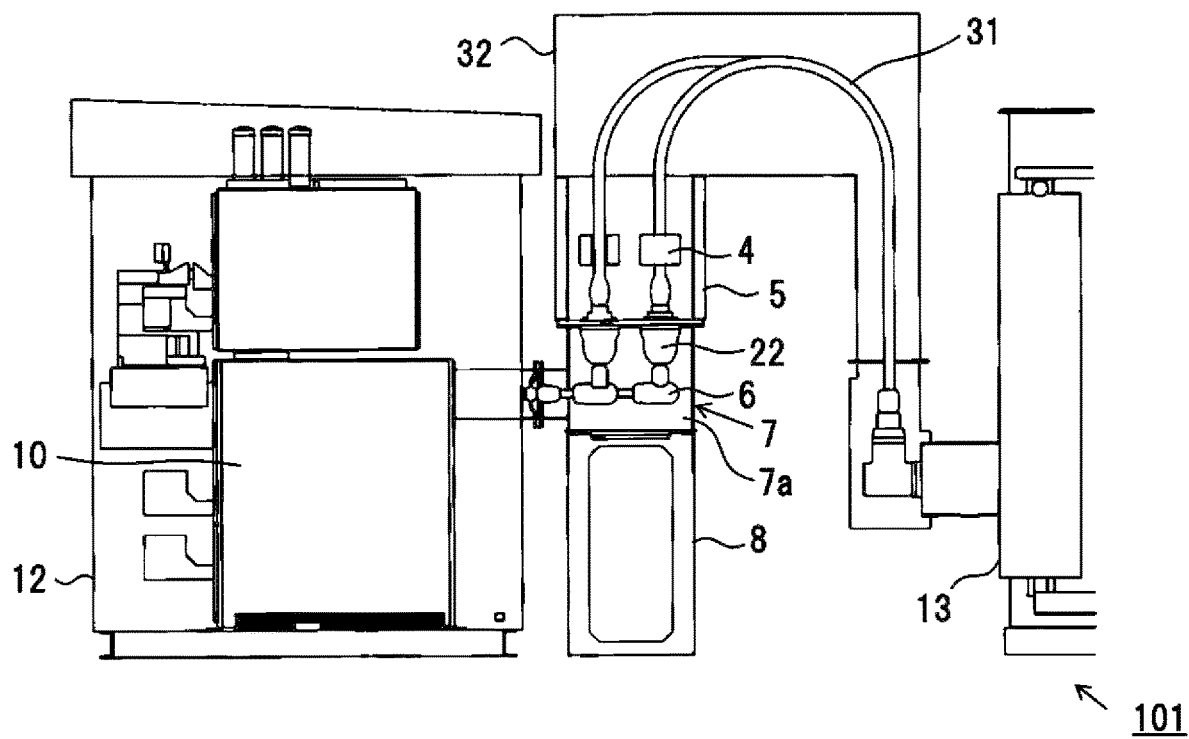
FIG. 6 is a sectional side view of a gas insulated switchgear according to the second embodiment.
Figure 7:
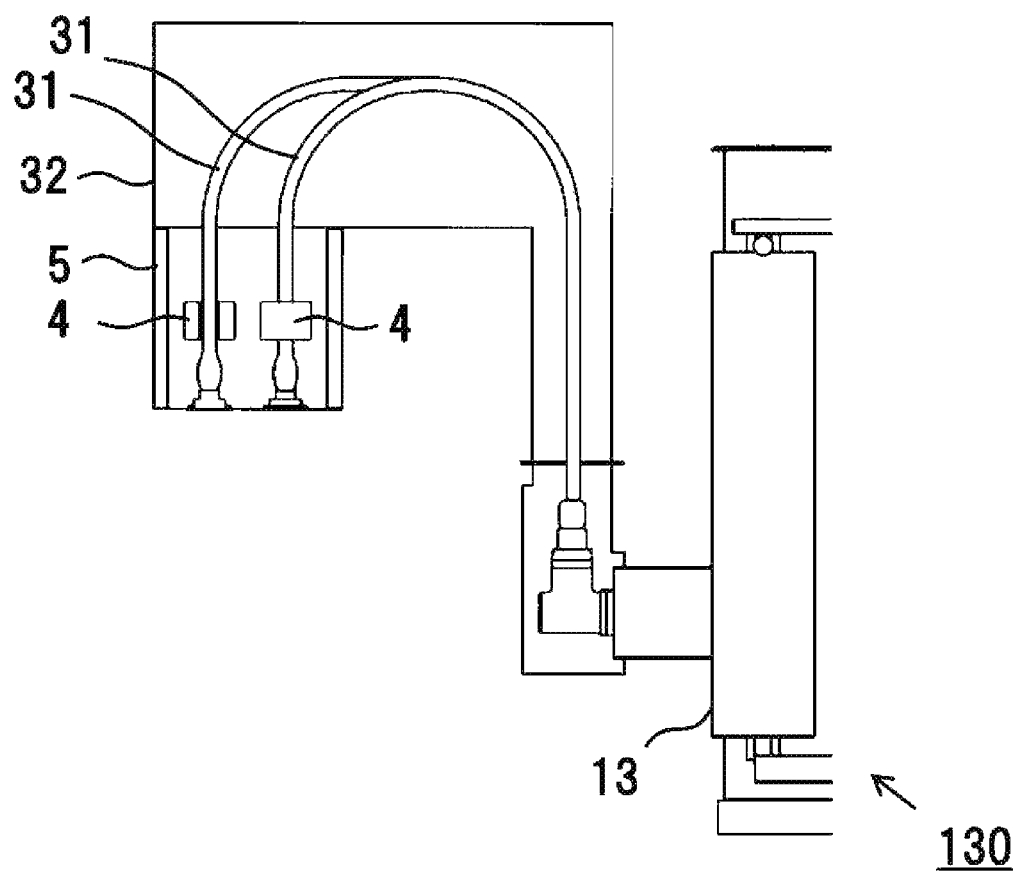
FIG. 7 is a sectional side view of a transformer component portion of FIG. 6 and a connection component portion thereof.

FIG. 6 is a sectional side view of the gas insulated switchgear 101 according to the second embodiment, having a configuration wherein the transformer side connection component portion 130 (to be described hereinafter) shown in FIG. 7 is connected to the heretofore described main body portion side connection component portion 110 shown in FIG. 2, and the transformer primary unit 13 disposed in the rear of the main body portion 10 via the mid tank 7 is configured in the state in which cables 31 connected to the respective conductor portions 6 are inserted into a cable duct 32 and supported therein between the transformer primary unit 13 and the mid tank 7.

The gas insulated switchgear 101 shown in FIG. 6, in which the left side of the sheet is the front of the apparatus, is such that the details of configuration thereof are that the mid tank 7 is disposed in the rear of the main body portion 10, wherein the cable duct 32 is disposed above the mid tank 7 via the support panel 5 which supports the cables 31 connected to the bushings 22 of the mid tank 7. Then, the cables 31 are wired inside the cable duct 32, and the conductor portions 6 in the mid tank 7 are electrically connected to the transformer primary unit 13 via the cables 31.

Here, it goes without saying that the support panel 5 can be configured integral with the cable duct 32.

In the configuration shown in FIG. 6, the portion between the main body portion 10 and the mid tank 7 is a hermetic portion, forming a gas insulated structure using an insulating gas (for example, an $SF_6$ gas).

Also, FIG. 7 is a sectional side view of the transformer component portion and the transformer side connection component portion 130 which is a connection component portion thereof.

The portion between the mid tank 7 and the transformer primary unit 13 is an open portion, forming a connection structure using the cables 31.

In the present configuration, a configuration is such that the mid tank 7 is disposed between the main body portion 10 of the gas insulated switchgear 101 and the transformer primary unit 13, connecting and disconnecting the cables 31 to and from the mid tank 7, so that the gas insulated switchgear 101 can be disassembled into the main body portion side connection component portion 110 and the transformer side connection component portion 130 when transporting, enabling one-by-one transportation, and it is possible to improve transportability.

Also, the cables 31 of the transformer side connection component portion 130 can in the open portion be connected to and disconnected from the bushings 22 of the mid tank 7 of the main body portion side connection component portion 110, eliminating the need for a gas treatment operation in a disassembling/assembling operation when disassembling and installing.

As in the gas insulated switchgear 101 according to the second embodiment, in the configuration wherein the transformer primary unit 13 is connected to the main body portion 10, too, in the same way as in the overhead line power reception configuration shown in the first embodiment, the hermetic structure of a portion required to be disassembled in the period between shipment up to on-site installation is abolished, and thereby there is no more operation to open the hermetic portion, preventing the hermetic property in each tank in which an insulating gas is sealed from being deteriorated, and insulating characteristics can be kept in a good state. Also, it is possible to reduce the number of operating devices accompanied by omitting the gas treatment operation when shipping and installing, the costs of transportation of the devices, and the gas treatment operating time.

The individual component portions (the connection target component portions) used for transformer direct connection and overhead line power reception are unified to be of a cable connection type, and thereby the main body portion side connection component portion 110 can be platformized without depending on the type of the connection target component portion, and can be used as a common unit of the gas insulated switchgears 100 and 101, so that it goes without saying that it is possible to obtain the advantageous effects of a reduction in costs and an improvement in quality stability.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST 1 bushing tank, 1a, 7a container, 3, 31 cable, 4 current transformer, 5 support panel, 6 conductor portion, mid tank, 8 mount, 9 three-phase spacer, 10 main body portion, 11 polymer bushing, 12 housing, 13 transformer primary unit, 21, 22 bushing, 32 cable duct, 100, 101 gas insulated switchgear, 110 main body portion side connection component portion, 120 bushing side connection component portion, 130 transformer side connection component portion

The invention claimed is:
1. A gas insulated switchgear, comprising:
a main body portion in which a switching apparatus is housed; and
a mid tank which, being provided in a rear of the main body portion, conductor portions extended out from which are led into a container having sealed therein an insulating gas, has bushings to which end portions of the conductor portions are connected, wherein cables extended out from a connection target component portion are connected to the bushings, and the bushings and the cables are connected together in a support component portion which is an open space, wherein the connection target component portion is a bushing tank to which external electrical power is supplied, and the bushing tank is disposed above the mid tank, and wherein the bushings are disposed on a top side of the mid tank, and the cables extend linearly upward from the bushings.

2. The gas insulated switchgear according to claim 1, wherein
inside the mid tank, three of the conductor portions led out from the main body portion are connected one to each of three of the bushings provided in the mid tank.

3. The gas insulated switchgear according to claim 2, wherein
the conductor portions are led out in a horizontal direction from the rear portion of the main body portion, led into a side portion of the mid tank, bent in a height direction inside the mid tank, and connected to the bushings.

4. The gas insulated switchgear according to claim 3, wherein
the mid tank is provided integral with the main body portion.

5. The gas insulated switchgear according to claim 2, wherein
the mid tank is provided integral with the main body portion.

6. The gas insulated switchgear according to claim 1, wherein
the conductor portions are led out in a horizontal direction from the rear portion of the main body portion, led into a side portion of the mid tank, bent in a height direction inside the mid tank, and connected to the bushings.

7. The gas insulated switchgear according to claim 6, wherein
the mid tank is provided integral with the main body portion.

8. The gas insulated switchgear according to claim 1, wherein
the bushing tank has three polymer bushings protruding from a top portion of the container in which an insulating gas is sealed, and the three polymer bushings are disposed in a straight line on the top portion of the container.

9. The gas insulated switchgear according to claim 8, wherein
the mid tank is provided integral with the main body portion.

10. The gas insulated switchgear according to claim 1, wherein
the mid tank is provided integral with the main body portion.

* * * * *